United States Patent
Tian

(10) Patent No.: US 11,201,490 B2
(45) Date of Patent: Dec. 14, 2021

(54) CHARGING METHOD, TERMINAL, AND NON-TRANSITORY COMPUTER READABLE STORAGE MEDIUM

(71) Applicant: GUANGDONG OPPO MOBILE TELECOMMUNICATIONS CORP., LTD., Guangdong (CN)

(72) Inventor: Chen Tian, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 129 days.

(21) Appl. No.: 16/701,593

(22) Filed: Dec. 3, 2019

(65) Prior Publication Data

US 2020/0106285 A1 Apr. 2, 2020

Related U.S. Application Data

(63) Continuation of application No. PCT/CN2018/104443, filed on Sep. 6, 2018.

(51) Int. Cl.
*H02J 7/00* (2006.01)

(52) U.S. Cl.
CPC ...... *H02J 7/007182* (2020.01); *H02J 7/0047* (2013.01)

(58) Field of Classification Search
None
See application file for complete search history.

(56) References Cited

U.S. PATENT DOCUMENTS

| 9,219,368 | B2 * | 12/2015 | Kurokawa | H02J 7/0029 |
| 2004/0195996 | A1 * | 10/2004 | Nishida | H02J 7/0071 320/103 |
| 2007/0236408 | A1 * | 10/2007 | Yamaguchi | G06F 3/1431 345/1.1 |
| 2008/0303485 | A1 * | 12/2008 | Ng | H01M 10/482 320/139 |
| 2013/0002199 | A1 * | 1/2013 | Hu | H02J 7/00036 320/112 |

(Continued)

FOREIGN PATENT DOCUMENTS

| CN | 1845418 | 10/2006 |
| CN | 101636872 | 1/2010 |

(Continued)

OTHER PUBLICATIONS

EPO, Communication for EP Application No. 18932725.7, dated Mar. 10, 2021.

(Continued)

*Primary Examiner* — Arun C Williams
(74) *Attorney, Agent, or Firm* — Hodgson Russ LLP

(57) ABSTRACT

Provided are a charging method, a terminal, and a non-transitory computer storage medium. The method includes the following. A charging voltage is detected in applying flash fast charging (FFC) to a terminal. Whether to end the FFC is determined according to the charging voltage. FFC is ended and a standing duration is recorded, where the standing duration is indicative of time which has elapsed after charging of a terminal is ended. A preset safe current is applied to the terminal, when the standing duration is longer than or equal to a preset threshold duration.

20 Claims, 5 Drawing Sheets

(56) References Cited

U.S. PATENT DOCUMENTS

| 2014/0111139 A1* | 4/2014 | Chen ................... H02J 7/00714 |
| | | 320/107 |
| 2016/0099593 A1 | 4/2016 | Lim |
| 2016/0209474 A1* | 7/2016 | Chiu .................... H02J 7/0071 |
| 2017/0093189 A1* | 3/2017 | Zeng .................... H04M 19/08 |

FOREIGN PATENT DOCUMENTS

| CN | 103107378 | 5/2013 |
| CN | 105870526 | 8/2016 |
| CN | 106602159 | 4/2017 |
| CN | 107768757 | 3/2018 |
| JP | 2013200714 A | 10/2013 |
| WO | 2017110578 | 6/2017 |

OTHER PUBLICATIONS

First Examination Report issued in corresponding IN application No. 201917049760 dated Oct. 5, 2020.
EESR issued in corresponding European application No. 18932725.7 dated Sep. 21, 2020.
ISR issued in corresponding international application No. PCT/CN2018/104443 dated Jun. 4, 2019.
EPO, Communication for EP Application No. 18932725.7, dated Aug. 11, 2021.

* cited by examiner

CHARGING METHOD, TERMINAL, AND NON-TRANSITORY COMPUTER READABLE STORAGE MEDIUM

CROSS-REFERENCE TO RELATED APPLICATION

This application is a continuation application of International Application No. PCT/CN2018/104443, filed on Sep. 6, 2018, the entire disclosure of which is incorporated herein by reference.

TECHNICAL FIELD

This disclosure relates to the field of charging technology for terminals, and more particularly to a charging method, a terminal, and a computer storage medium.

BACKGROUND

During charging of a terminal, in order to guarantee no battery overvoltage, a constant-voltage stage will last for a long time, which decreases greatly a charging speed. In the related art, a flash fast charging (FFC) algorithm has been introduced to increase a charging cut-off current, such that the battery of the terminal can be overvoltage charged with a voltage which exceeds a rated voltage of the battery during charging, thereby omitting a constant-voltage charging and shortening a charging time.

However, with aging of the battery of the terminal, an internal resistance of the battery will increase accordingly. In this situation, when the battery is charged based on the FFC algorithm, since a cut-off current has been increased, a float voltage of the battery will increase, which makes the battery unable to reach a saturated charging state and thus reduces a standby performance of the terminal.

SUMMARY

Implementations of the present disclosure provide a charging method. The method includes the following. A charging voltage is detected in applying flash fast charging (FFC) to a terminal. Whether to end the FFC is determined according to the charging voltage. FFC is ended and a standing duration is recorded, where the standing duration is indicative of time which has elapsed after charging of a terminal is ended. Apply a preset safe current to the terminal in response to the standing duration being longer than or equal to a preset threshold duration.

Implementations of the present disclosure provide a terminal. The terminal includes a battery, a processor, and a memory. The memory is coupled with the processor and configured to store programs which, when executed by the processor, are operable with the processor to: detect a charging voltage in applying flash fast charging (FFC) to the battery; end the FFC according to the charging voltage and record a standing duration, wherein the standing duration is indicative of time which has elapsed after charging of the terminal is ended; apply a preset safe current to the battery in response to the standing duration being longer than or equal to a preset threshold duration.

Implementations of the present disclosure provide a non-transitory computer readable storage medium configured to store programs which, when executed with a computer, are operable with the computer to perform the above charging method.

DETAILED DESCRIPTION

Figure 1:
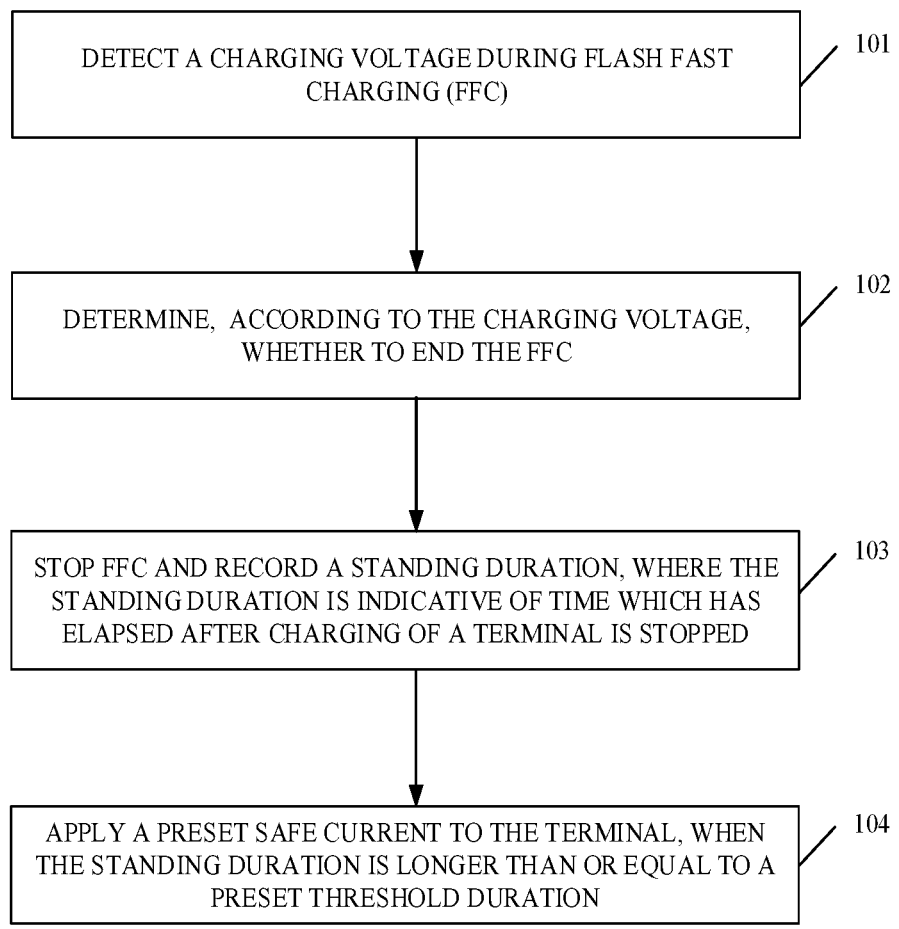
FIG. 1 is a schematic flowchart of a charging method according to an implementation of the present disclosure.

Technical solutions of implementations of the present disclosure will be described clearly and completely with reference to accompanying drawings in implementations of the present disclosure. It can be understood that, implementations described herein are merely for explaining, rather than limiting, the present disclosure. In addition, for the convenience of description, the accompanying drawings only illustrate parts related to the present disclosure.

When a battery of a terminal is charged, a conventional charging manner mainly includes a trickle charging, a constant-current charging, and a constant-voltage charging. Accordingly, a whole charging period of the terminal can include a trickle charging stage, a quick charging stage, and a continuous charging stage. After the quick charging stage and the continuous charging stage, although power or electric quantity of a system of the terminal is displayed to be "100%", the battery actually has not reached a saturated state. In this case, the remaining capacity of the battery can only be supplemented with a tiny pulsed current, which usually takes thirty to forty minutes. Only after the above three stages are completed can the battery reach a power saturation state.

In addition, although quick charging can quickly charge the battery to make its power reach 100%, it is still necessary to perform continuous charging to fully charge the battery. The continuous charging occurs when the battery is about to be fully charged. In the continuous charging, a charging voltage is gradually decreased to ensure that the battery is fully charged. The trickle charging occurs after the battery is fully charged. In the trickle charging, the battery is charged with a small current, which can keep electrons flowing and thus prolong a service life of the battery. Through the above three charging stages, when the terminal is charged, the battery will experience no overcurrent in a low-power state and experience no overvoltage in a high-power state.

In addition, in the whole charging period of the terminal, a longer time of constant-current charging with a large current will result in a higher charging speed. In order to increase the charging speed, it is necessary to prolong the time of constant-current charging and shorten a time of the constant-voltage charging as much as possible. However, in order to ensure that no overvoltage occurs to the battery, a constant-voltage stage will certainly last long, which decreases the charging speed.

According to an FFC algorithm, by increasing a charging cut-off current, the battery of the terminal can be charged with a voltage which exceeds a rated voltage (overvoltage charging for short); as such, the constant-voltage charging can be omitted, as long as a float voltage is controlled during charging to ensure that an actual voltage (VBAT) across a cell will not experience overvoltage.

Hereinafter, technical solutions of implementations of the disclosure will be described clearly and completely with reference to the accompanying drawings in implementations of the disclosure.

In implementations of the disclosure, a charging method is provided. In the charging method, a charging voltage of a terminal is detected in applying flash fast charging (FFC) to the terminal, so as to determine, according to the charging voltage, whether to end the FFC. Once the FFC is ended, a standing duration is recorded, where the standing duration is indicative of time which has elapsed after the FFC is ended. Then a preset safe current is applied to the battery in response to the standing duration being longer than or equal to a preset threshold duration. FIG. 1 is a schematic flowchart of a charging method according to an implementation of the present disclosure. As illustrated in FIG. 1, the charging method for a terminal begins at block 101.

At block 101, a charging voltage is detected in applying FFC to a terminal.

In implementations of the disclosure, the terminal can detect first the charging voltage during the FFC. The charging voltage can be an open-circuit voltage of a battery the terminal. The open-circuit voltage refers to a voltage of the battery when the battery is in an open-circuit state, where the open-circuit voltage of the battery is equal to the potential difference between the positive electrode and the negative electrode of the battery when the battery is open-circuit (i.e., when no current passes through the positive electrode and the negative electrode).

It is to be noted that, in implementations of the disclosure, the terminal may be any terminal with a communication and storage function and is configured with the battery. Examples of the terminal include a tablet computer, a mobile phone, an e-reader, a remote control, a personal computer (PC), a notebook computer, an in-vehicle equipment, an Internet protocol television (IPTV), a wearable device, or the like.

In addition, in implementations of the disclosure, the FFC is a quick charging algorithm. Specifically, by increasing a charging cut-off current, the battery of the terminal can be allowed to be overvoltage charged with a voltage which exceeds the rated voltage of the battery, thereby skipping a constant-voltage charging stage during charging, that is, the constant-voltage charging is omitted. It is to be noted that, during the FFC of the terminal, it is necessary to control a float voltage to ensure that an actual voltage across a cell will not experience overvoltage.

In addition, in an implementation, before detecting the charging voltage during the FFC, the terminal establishes a connection with a charging apparatus and enables the FFC.

Figure 2:
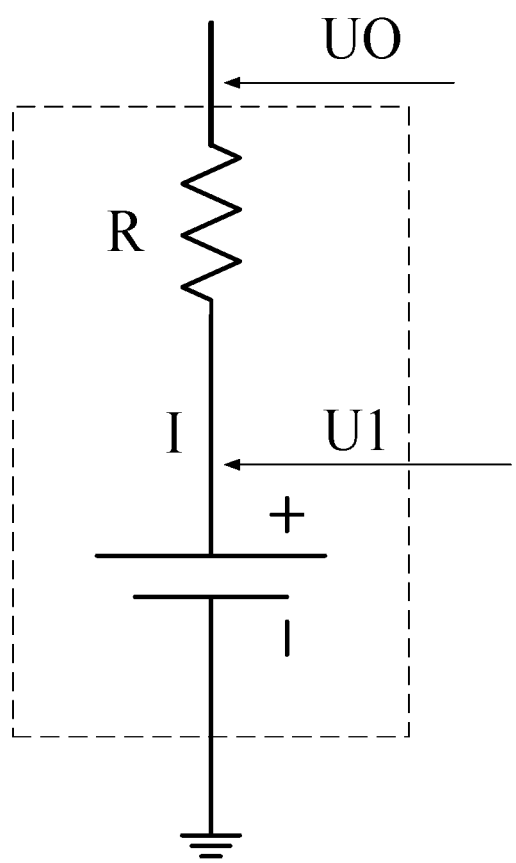
FIG. 2 is a circuit diagram illustrating charging of a battery of a terminal according to implementations of the present disclosure.

FIG. 2 is a circuit diagram illustrating charging of a battery of a terminal according to an implementation of the present disclosure. As illustrated in FIG. 2, an internal resistance of the battery is represented by R, a charging current is represented by I, and an actual voltage across a cell is represented by U1, which is however not equal to an open-circuit voltage U0 of the battery. As illustrated in FIG. 2, a sum of the actual voltage U1 across the cell and a float voltage corresponding to the internal resistance R of the battery is equal to the open-circuit voltage U0 of the battery, where the open-circuit voltage U0 of the battery can be obtained through formula (1):

$$U0 = I*R + U1 \quad (1)$$

It is to be noted that, in implementations of the disclosure, with aging of the battery of the terminal, the internal resistance R of the battery may increase. In this situation, when the battery is charged, the float voltage of the battery will increase accordingly. During the above FFC of the terminal, the float voltage of the battery will be increased since the cut-off current has been increased, which decreases the actual voltage across the cell of the battery, thereby making the battery unable to be fully charged.

In addition, in implementations of the disclosure, during the FFC of the terminal, the open-circuit voltage of the battery can be detected in real time, that is, the charging voltage can be detected. As such, whether to end the FFC can be determined according to the charging voltage, and the terminal can switch to constant-voltage charging in which a small current is applied to the terminal, to solve the problem that the battery is unable to be fully charged during the FFC due to aging.

At block 102, whether to end the FFC is determined according to the charging voltage.

In implementations of the disclosure, after detecting the charging voltage during the FFC, the terminal can further determine whether to end the FFC according to the charging voltage.

It is to be noted that, in implementations of the disclosure, after acquiring the charging voltage, the terminal can compare the charging voltage with a preset threshold voltage which has been set in advance to further determine whether to end the FFC according to the comparison result.

It is to be noted that, in implementations of the disclosure, the preset threshold voltage may be an upper limit value of voltage set in advance for the terminal, or a cut-off voltage of the battery of the terminal.

At block 103, FFC is ended and a standing duration is recorded, where the standing duration is indicative of time which has elapsed after FFC is ended.

In implementations of the disclosure, after determining whether to end the FFC according to the charging voltage, the terminal can end the FFC and begin to record the standing duration upon determining to end the FFC.

It is to be noted that, in implementations of the disclosure, the standing duration refers to non-charging (the terminal is not charged) time which has elapsed after the charging voltage reaches the preset threshold voltage and the FFC is ended.

In addition, in implementations of the disclosure, because of the increase of the internal resistance R with aging of the battery of the terminal, the float voltage of the battery will increase when the battery is charged. Since the actual voltage across the cell of the battery is unable to be detected, in order to avoid damage of the battery, it is necessary for the terminal to end the FFC after the charging voltage satisfies the preset threshold voltage. As such, after the terminal stands for a while, the float voltage will decrease.

In addition, in implementations of the disclosure, the terminal can start to record the time of battery standing once the FFC is ended, thereby further determining whether to start charging according to the standing duration.

At block 104, a preset safe current is applied to the terminal, when the standing duration is longer than or equal to a preset threshold duration.

In implementations of the disclosure, after determining to end the FFC according to the charging voltage and recording the standing duration, the terminal can be charged according to the preset safe current when the standing duration is equal to or longer than the preset threshold duration.

It is to be noted that, in implementations of the disclosure, after recording the standing duration, the terminal can compare the standing duration with the preset threshold duration, thereby determining whether to continue charging according to the comparison result.

In addition, in implementations of the disclosure, the terminal can set in advance the preset threshold duration. According to the preset threshold duration, whether the float voltage has decreased can be determined. For example, the float voltage of the battery can be considered to decrease after charging is ended for 20 s, and accordingly the preset threshold duration can be set to 20 s.

Figure 3:
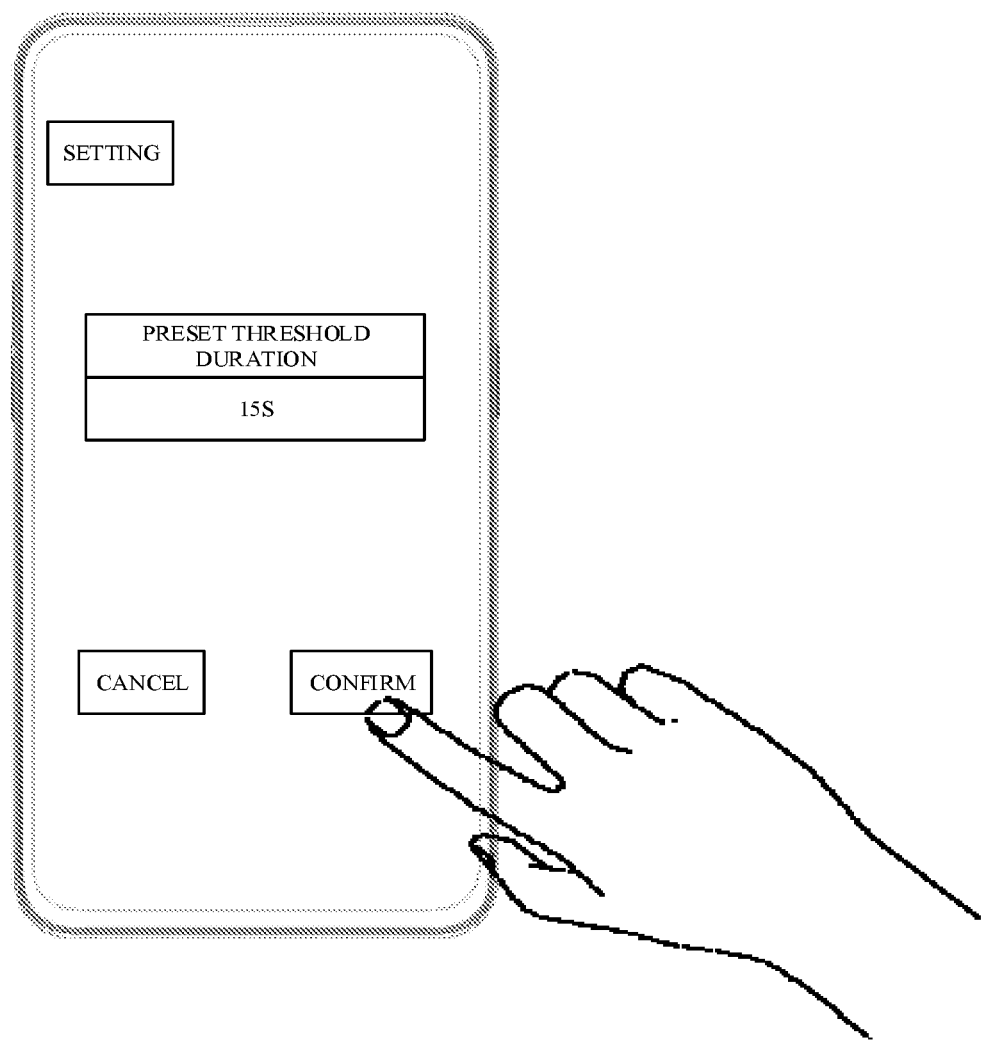
FIG. 3 is a schematic diagram illustrating determination of a preset threshold duration according to implementations of the present disclosure.
Figure 4:
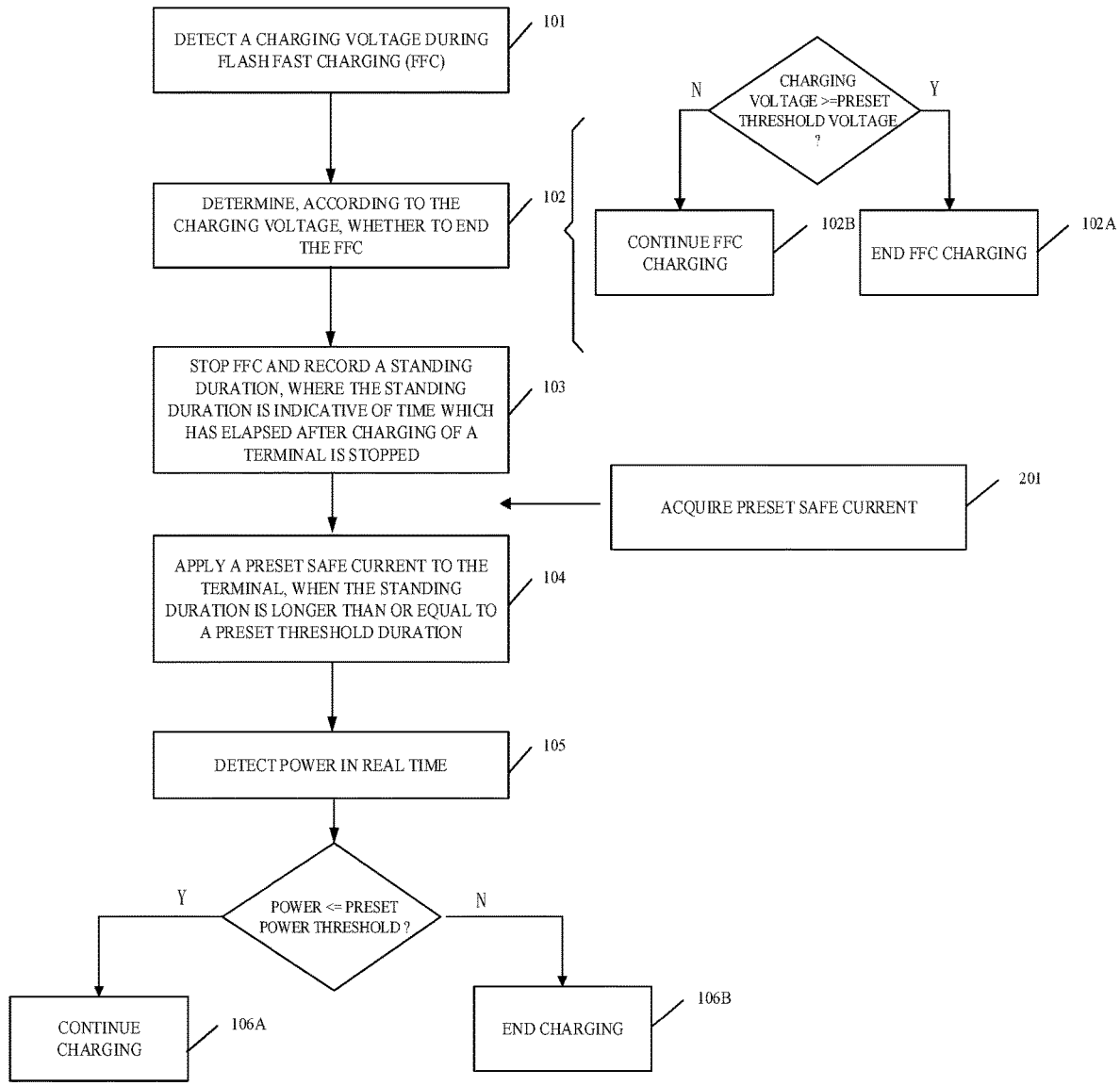
FIG. 4 is a circuit diagram illustrating charging of a battery of a terminal according to implementations of the present disclosure.

Furthermore, the terminal can set the preset threshold duration in various manners. For example, the terminal can set the preset threshold duration according to user's choice, or determine the preset threshold duration according to default internal resistance parameters of the battery. FIG. 3 is a schematic diagram illustrating determination of a preset threshold duration according to an implementation of the present disclosure. As illustrated in FIG. 3, the terminal determines that the preset threshold duration is 15 s by receiving the "Confirm" operation of the user.

It is to be noted that, in implementations of the disclosure, after comparing the standing duration with the preset threshold duration, if the standing duration is determined to be longer than or equal to the preset threshold duration, the terminal may consider that the float voltage has decreased and the preset safe current will be applied to the terminal for charging.

In addition, in implementations of the disclosure, after comparing the standing duration with the preset threshold duration, if the standing duration is determined to be shorter than the preset threshold duration, the terminal may consider that the float voltage has not decreased and the preset safe current cannot be applied to the terminal for charging yet.

According to the charging method provided herein, the terminal detects the charging voltage during the FFC and determines whether to end the FFC according to the charging voltage. The terminal ends charging and records the standing duration, upon determining to end the FFC, where the standing duration is indicative of time which has elapsed after charging of the terminal is ended. Preset safe current is applied to the terminal, when the standing duration is longer than or equal to the preset threshold duration. As such, the terminal can detect the charging voltage during the FFC, determine whether to end the FFC according to the charging voltage, and after the FFC is ended and the standing duration satisfies the preset threshold duration, a small preset safe current is applied to the battery of the terminal until the battery is fully charged. In other words, even if the float voltage may increase during the FFC, a small current can still be applied to battery of the terminal for constant-voltage charging after the float voltage has decreased while the terminal is in a standing state after the FFC, which is possible to solve the problem that the battery is unable to reach a saturated charging state due to increase in float voltage, thereby improving a standby performance of the terminal.

In implementations of the disclosure, the terminal determines whether to end the FFC according to the charging voltage as follows.

At block 102A, determine to end the FFC when the charging voltage is equal to or higher than a preset threshold voltage.

In implementations of the disclosure, after detecting the charging voltage during the FFC, if the charging voltage is determined to be higher than or equal to the preset threshold voltage, the terminal can determine to end the FFC.

It is to be noted that, in implementations of the disclosure, the terminal can set in advance an upper limit value of voltage, that is, the preset threshold voltage. According to the preset threshold voltage, whether to continue the FFC can be determined.

In addition, in implementations of the disclosure, after acquiring the charging voltage, the terminal can compare the charging voltage with the preset threshold voltage to determine whether to end the FFC according to the comparison result.

Furthermore, in implementations of the disclosure, after comparing the charging voltage with the preset threshold voltage, if the charging voltage is determined to be higher than or equal to the preset threshold voltage, the terminal may consider that the FFC is completed and as such, the terminal can determine to end the FFC.

At block 102B, determine to continue the FFC when the charging voltage is lower than the preset threshold voltage.

In implementations of the disclosure, after detecting the charging voltage during the FFC, if the charging voltage is determined to be lower than the preset threshold voltage, the terminal can determine to continue the FFC.

In addition, in implementations of the disclosure, after acquiring the charging voltage, the terminal can compare the charging voltage with the preset threshold voltage to determine whether to end the FFC according to the comparison result.

Furthermore, in implementations of the disclosure, after comparing the charging voltage with the preset threshold voltage, if the charging voltage is determined to be lower than the preset threshold voltage, the terminal may consider that the FFC is not completed and thus the terminal needs to continue the FFC.

In an implementation, the preset safe current is applied to the terminal as follows.

At block 201, the preset safe current is acquired.

In implementations of the disclosure, after determining to end the FFC according to the charging voltage and recording the standing duration, if the standing duration is determined to be equal to or longer than the preset threshold duration, the terminal can first acquire the preset safe current.

It is to be noted that, in implementations of the disclosure, after determining that the standing duration satisfies a re-charging condition, the terminal can acquire the preset safe current used for charging.

In addition, in implementations of the disclosure, the preset safe current is a small current. The preset safe current can be applied to the battery of the terminal for constant-voltage charging until a power of the battery is saturated.

At block 104, the preset safe current is applied to the terminal for constant-voltage charging.

In implementations of the disclosure, if the standing duration is determined to be equal to or longer than the preset threshold duration, after acquiring the preset safe current, the preset safe current can be applied to the terminal for constant-voltage charging.

It is to be noted that, in implementations of the disclosure, after the FFC is ended, a small preset safe current can be applied to battery of the terminal for constant-voltage charging, thereby solving the problem that power of the battery is unable to reach a saturated state due to increase in float voltage caused by aging of the battery.

According to the charging method provided herein, the terminal detects the charging voltage during the FFC and determines whether to end the FFC according to the charging voltage. The terminal ends charging and records the standing duration, upon determining to end the FFC, where the standing duration is indicative of time which has elapsed after charging of the terminal is ended. The preset safe current is applied to the terminal for charging, when the standing duration is longer than or equal to the preset threshold duration. As such, the terminal can detect the charging voltage during the FFC, determine whether to end the FFC according to the charging voltage, and after the FFC is ended and the standing duration satisfies the preset threshold duration, a small preset safe current is applied to the battery of the terminal until the battery is fully charged. In other words, even though the float voltage may increase during the FFC, after the float voltage has decreased while the terminal is in a standing state after the FFC, a small current can be applied to the terminal for constant-voltage charging, which is possible to solve the problem that the battery is unable to reach a saturated charging state due to increase in float voltage, thereby improving a standby performance of the terminal.

In implementations, when the standing duration is longer than or equal to the preset threshold duration, after the preset safe current is applied to the terminal (that is, after operations at block 104), the charging method for a terminal further includes the following.

At block 105, an electric quantity (also known as "power") is detected in real time.

In implementations of the disclosure, when the preset safe current is applied to the terminal, the terminal can detect in real time electric quantity of the battery to acquire the electric quantity of the terminal, that is, present electric quantity.

At block 106, whether to end charging is determined according to the electric quantity of the terminal.

In implementations of the disclosure, after detecting in real time the electric quantity of the battery to acquire the present electric quantity, the terminal can determine whether to end charging according to the present electric quantity.

In an implementation, the terminal determines whether to end charging according to the present electric quantity as follows.

At block 106A, determine to continue charging when the electric quantity is lower than or equal to a preset threshold electric quantity.

In implementations of the disclosure, after detecting in real time the electric quantity of the battery to acquire the present electric quantity, if the present electric quantity is determined to be lower than or equal to the preset threshold electric quantity, the terminal can determine to continue charging.

It is to be noted that, in implementations of the disclosure, the terminal can set in advance the preset threshold electric quantity. According to the preset threshold electric quantity, whether the electric quantity satisfies a fully-charged condition can be determined. In addition, the terminal can set the preset threshold electric quantity in various manners. For example, the terminal can set the preset threshold electric quantity according to user's choice, or determine the preset threshold electric quantity according to default internal resistance parameters of the battery.

It is to be noted that, in implementations of the disclosure, after determining the present electric quantity, the terminal can compare the present electric quantity with the preset threshold electric quantity, thereby determining, according to the comparison result, whether to continue charging.

In addition, in implementations of the disclosure, after comparing the present electric quantity with the preset threshold electric quantity, if the present power is determined to be lower than or equal to the preset threshold electric quantity, the terminal may consider that it is necessary to continue charging the battery, and as a result, determine to continue charging.

At block 106B, determine to end charging when the electric quantity is higher than the preset threshold electric quantity.

In implementations of the disclosure, after detecting in real time the power of the battery to acquire the present power, if the present power is determined to be higher than the preset threshold electric quantity, the terminal determines to end charging.

It is to be noted that, in implementations of the disclosure, after determining the present power, the terminal can compare the present power with the preset threshold electric quantity to determine, according to the comparison result, whether to continue charging.

In addition, in implementations of the disclosure, after comparing the present electric quantity with the preset threshold electric quantity, if the present electric quantity is determined to be higher than the preset threshold electric quantity, the terminal may consider that the electric quantity of the battery satisfies a saturation condition and thus determine to end charging.

According to the charging method provided herein, the terminal detects the charging voltage during the FFC and determines, according to the charging voltage, whether to end the FFC. The terminal ends charging and records the standing duration, upon determining to end the FFC, where the standing duration is indicative of time which has elapsed after charging of the terminal is ended. The preset safe current is applied to the battery, when the standing duration is longer than or equal to the preset threshold duration. As such, the terminal can detect the charging voltage during the FFC, determine, according to the charging voltage, whether to end the FFC, and after the FFC is ended and the standing duration satisfies the preset threshold duration, a small preset safe current is applied to the battery of the terminal until the battery is fully charged. In other words, even though the float voltage may increase during the FFC, after the float voltage has decreased while the terminal is in a standing state after the FFC, a small current can still be applied to the terminal for constant-voltage charging, which is possible to solve the problem that the battery is unable to reach a saturated charging state due to increase in float voltage, thereby improving a standby performance of the terminal.

Figure 5:
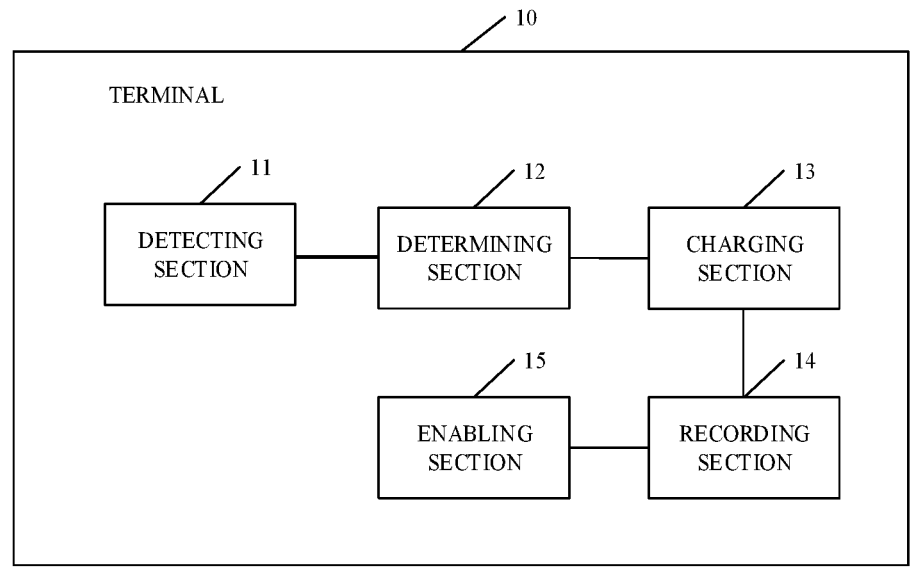
FIG. 5 is schematic structural diagram 1 illustrating a terminal according to implementations of the present disclosure.

FIG. 5 is a schematic structural diagram illustrating a terminal according to an implementation of the present disclosure. As illustrated in FIG. 5, the terminal 10 in implementations of the disclosure includes a detecting section 11, a determining section 12, a charging section 13, a recording section 14, and an enabling section 15. The detecting section 11 can be embodied as a detecting circuit which can detect charging voltage of the terminal 10. The determining section 12, the charging section 13, and the enabling section 15 can be integrated as a charging controller configured to control charging of the terminal 10. The recording section 14 can be a timer. In an implementation, the detecting section 11, the determining section 12, the charging section 13, the recording section 14, and the enabling section 15 can be structured as one single controller or processor such as processor 16 illustrated in FIG. 6.

The detecting section 11 is configured to detect a charging voltage in applying FFC to the terminal. After the detecting section 11 detects the charging voltage, the determining section 12 is configured to determine, according to the charging voltage, whether to end the FFC. The charging section 13 is configured to end FFC when the determining section 12 determines, according to the charging voltage, to end the FFC. The recording section 14 is configured to record a standing duration when the FFC is determined to be ended, where the standing duration is indicative of time which has elapsed after FFC of the terminal is ended. The charging section 13 is further configured to apply a preset safe current to the terminal when the standing duration is longer than or equal to a preset threshold duration.

In an implementation, the determining section 12 is configured to: determine to end the FFC when the charging voltage is equal to or higher than a preset threshold voltage; determine to continue the FFC when the charging voltage is lower than the preset threshold voltage.

In an implementation, the charging section 13 is configured to: acquire the preset safe current; apply the preset safe current to the terminal for constant-voltage charging.

In an implementation, the detecting section 11 is further configured to detect an electric quantity of a battery of the terminal in real time when or after the charging section 13 applies the preset safe current to the battery of the terminal for charging. The determining section 12 is further configured to determine, according to the present electric quantity, whether to end charging.

In an implementation, the determining section 12 is configured to: determine to continue charging when the present electric quantity is lower than or equal to a preset threshold electric quantity; determine to end charging when the present electric quantity is higher than the preset threshold electric quantity.

In an implementation, the enabling section 15 is configured to establish a connection with a charging apparatus and enable FFC before the detecting section 11 detects the charging voltage during the FFC.

Figure 6:
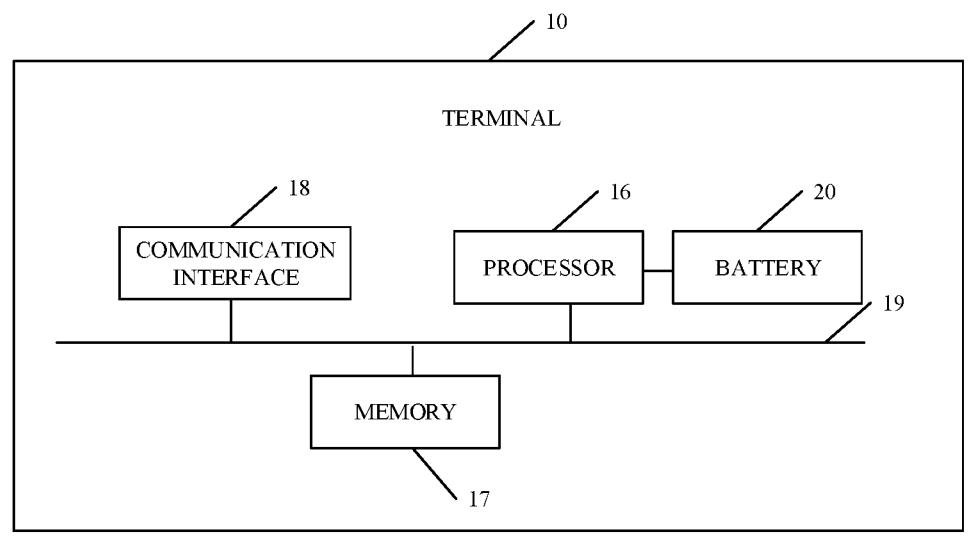
FIG. 6 is schematic structural diagram 2 illustrating a terminal according to implementations of the present disclosure.

FIG. 6 is a schematic structural diagram illustrating a terminal according to an implementation of the present disclosure. As illustrated in FIG. 6, the terminal 10 includes a processor 16 and a memory 17 configured to store instructions operable with the processor 16. The terminal 10 can further include a communication interface 18 and a bus 19 configured to be coupled with the processor 16, the memory 17, and the communication interface 18. The terminal 10 further includes a battery 20.

In implementations of the disclosure, the processor 16 may be at least one of an application specific integrated circuit (ASIC), a digital signal processor (DSP), a digital signal processing device (DSPD), a programmable logic device (PLD), a field programmable gate array (FPGA), a central processing unit (CPU), a controller, a microcontroller, and a microprocessor. It can be understood that, for different apparatuses, electronic devices for implementing a function of the processor may be other devices, which is not limited in implementations of the disclosure. The terminal 10 further includes the memory 17 configured to be coupled with the processor 16. The memory 17 is configured to store executable program codes. The executable program codes include instructions operable with a computer. The memory 17 may include a high speed RAM, or may further include a non-transitory memory, for example, at least two magnetic storage devices.

In implementations of the disclosure, the bus 19 is configured to be coupled with the communication interface 18, the processor 16, and the memory 17 for communication between these devices.

In implementations of the disclosure, the memory 17 is configured to store instructions and data.

In implementations of the disclosure, the processor 16 is configured to: detect a charging voltage of the battery in applying FFC to the terminal; determine, according to the charging voltage, to end the FFC and record a standing duration, where the standing duration is indicative of time which has elapsed after charging of the terminal is ended; apply a preset safe current to the battery, when the standing duration is longer than or equal to a preset threshold duration.

The processor 16 determines, according to the charging voltage detected, whether to end the FFC. Specifically, the processor 16 determines to end the FFC when the charging voltage is equal to or higher than a preset threshold voltage, or the processor 16 determines to continue the FFC when the charging voltage is lower than the preset threshold voltage.

When the battery is charged with the preset safe current, the processor 16 is further configured to detect a electric quantity of the battery in real time and determine, according to the present electric quantity, whether to end charging. Specifically, the processor 16 determines to continue charging when the present electric quantity is lower than or equal to a preset threshold electric quantity, or the processor 16 determines to end charging when the present electric quantity is higher than the preset threshold electric quantity.

The charging voltage is an open-circuit voltage of the battery for example.

The preset threshold duration can be set considering at least one of: a float voltage of the battery, internal resistance parameters of the battery, and user settings, as described above.

In practice, the memory 17 may be a first transitory memory such as a first random-access memory (RAM), a first non-transitory memory such as a first read-only memory (ROM), a first flash memory, a hard disk drive (HDD), or a solid-state drive (SSD), or a combination of the first transitory memory and the first non-transitory memory. The memory 17 is configured to provide instructions and data to the processor 16.

In implementations of the disclosure, a non-transitory computer readable storage medium is provided, which is configured to store programs which, when executed with a computer, are operable with a computer to: detect a charging voltage of a terminal during flash fast charging (FFC); determine, according to the charging voltage, whether to end the FFC; end the FFC and record a standing duration, where the standing duration is indicative of time which has elapsed after the FFC is ended; apply a preset safe current to the terminal, when the standing duration is longer than or equal to a preset threshold duration.

Various functional units described in implementations herein may be integrated into one processing unit such as the processor 16 of FIG. 6 or may be present as a number of physically separated units, and two or more units may be integrated into one. The integrated unit may take the form of hardware or a software functional unit.

If the integrated units are implemented as software functional units and sold or used as standalone products, they may be stored in a computer readable storage medium. Based on such an understanding, the essential technical solution, or the portion that contributes to the prior art, or all or part of the technical solution of the disclosure may be embodied as software products. The computer software products can be stored in a storage medium and may include multiple instructions which, when executed, can cause a computing device, e.g., a personal computer, a server, a network device, etc., or a processor to execute part or all operations of the methods described in various implementations. The above storage medium may include various kinds of media that can store program codes, such as a universal serial bus (USB) flash disk, a mobile hard drive, a ROM, a RAM, a magnetic disk, or an optical disk.

With aid of the terminal provided in implementations of the disclosure, the terminal detects the charging voltage during the FFC and determines, according to the charging voltage, whether to end the FFC. The terminal ends charging and records the standing duration, upon determining to end the FFC, where the standing duration is indicative of time which has elapsed after charging of the terminal is ended. The terminal charges the terminal according to the preset safe current, when the standing duration is longer than or equal to the preset threshold duration. As such, the terminal can detect the charging voltage during the FFC, determine, according to the charging voltage, whether to end the FFC, and after the FFC is ended and the standing duration satisfies the preset threshold duration, apply a small preset safe current to the battery until the battery is fully charged. In other words, even though the float voltage may increase during the FFC, a small current can still be applied to the terminal for constant-voltage charging, after the float voltage has decreased while the terminal is ins standing state after the FFC, which is possible to solve the problem that the battery is unable to reach a saturated charging state due to increase in float voltage, thereby improving a standby performance of the terminal.

Implementations of the disclosure provide a computer readable storage medium configured to store programs. The programs, when executed, are operable with a processor to perform the method described in implementation 1 to implementation 3.

Specifically, program instructions corresponding to the charging method provided herein can be stored in a storage medium such as an optical disk, an HDD, a USB flash disk, or the like. When read or executed by an electronic device, the program instructions corresponding to the charging method in the storage medium are operable with the electronic device to: detect a charging voltage in applying FFC to a terminal; determine, according to the charging voltage, whether to end the FFC; end charging and record a standing duration upon determining to end the FFC, where the standing duration is indicative of time which has elapsed after charging of a terminal is ended; apply a preset safe current to the terminal, when the standing duration is longer than or equal to a preset threshold duration.

Those skilled in the art will understand that implementations of the disclosure can provide a method, a system, or a computer program product. Therefore, the disclosure may have hardware-only implementations, software-only implementations or software plus hardware implementations. In addition, the disclosure may be implemented in the form of a computer program product embodied on one or more computer usable storage media (including but not limited to a magnetic storage device, an optical memory, and the like) including computer usable program codes.

The disclosure is described herein with reference to schematic flowcharts and/or block diagrams of methods, apparatuses (systems), and computer program products according to the implementations of the disclosure. It should be understood that each flow and/or block in the flowchart and/or block diagram, and a combination of flow and/or block in the flowchart and/or block diagram can be implemented by computer program instructions. These computer program instructions may be provided to a general purpose computer, a special purpose computer, an embedded processor or a processor of other programmable data processing apparatuses to form a machine, such that devices for implementing functions specified by one or more flows in the flowchart and/or one or more blocks in the block diagram may be generated by executing the instructions with the processor of the computer or other programmable data processing apparatuses.

The computer program instructions may also be stored in a computer-readable memory that can direct the computer or other programmable data processing apparatuses to operate in a given manner, so that the instructions stored in the computer-readable memory produce a manufactured article including an instruction device, and the instruction device implements the functions specified by one or more flows in the flowchart and/or one or more blocks in the block diagram.

The computer program instructions may also be loaded onto the computer or other programmable data processing apparatuses, such that a series of process steps may be executed on the computer or other programmable data processing apparatuses to produce process implemented by the computer, so that the instructions executed on the computer or other programmable data processing apparatuses provide steps for implementing the functions specified by one or more flows in the flowchart and/or one or more blocks in the block diagram.

The above implementations are only the exemplary implementations of the disclosure and are however not for limiting the scope of the disclosure.

INDUSTRIAL APPLICABILITY

Implementations of the present disclosure provide a charging method, a terminal, and a computer storage medium. The terminal detects charging voltage in applying FFC to a terminal and determines, according to the charging voltage, whether to end the FFC. The terminal ends charging and records a standing duration, upon determining to end the FFC, where the standing duration is indicative of time which has elapsed after charging of a terminal is ended. A preset safe current is applied to the terminal for charging, when the standing duration is longer than or equal to a preset threshold duration. As such, the terminal can detect the charging voltage during the FFC, determine, according to the charging voltage, whether to end the FFC, and after the FFC is ended and the standing duration satisfies the preset threshold duration, a small preset safe current is applied to the battery until the battery is fully charged. In other words, even though a float voltage may increase during the FFC, after the float voltage has decreased while the terminal is in a standing state after the FFC, a small current can still be applied to the terminal for constant-voltage charging, which is possible to solve the problem that the battery is unable to reach a saturated charging state due to increase in float voltage, thereby improving a standby performance of the terminal.

What is claimed is:
1. A charging method, comprising:
   detecting a charging voltage in applying flash fast charging (FFC) to a terminal;
   determining, according to the charging voltage, whether to end the FFC;

ending the FFC and temporarily stopping charging of the terminal, and recording a standing duration in which no charging voltage is applied to the terminal, wherein the standing duration is indicative of time which has elapsed after the FFC is ended; and applying a preset safe current to the terminal in response to the standing duration being longer than or equal to a preset threshold duration.

2. The method of claim 1, wherein determining, according to the charging voltage, whether to end the FFC comprises:
determining to end the FFC in response to the charging voltage being equal to or higher than a preset threshold voltage.

3. The method of claim 2, wherein determining, according to the charging voltage, whether to end the FFC comprises:
determining to continue the FFC in response to the charging voltage being lower than the preset threshold voltage.

4. The method of claim 2, wherein the preset threshold voltage is a cut-off voltage of a battery.

5. The method of claim 1, wherein applying the preset safe current to the terminal comprises:
acquiring the preset safe current; and
applying the preset safe current to the terminal for constant-voltage charging.

6. The method of claim 1, further comprising the following after charging the terminal according to the preset safe current when the standing duration is longer than or equal to the preset threshold duration:
detecting an electric quantity of a battery in real time; and
determining, according to the electric quantity, whether to end charging of the terminal.

7. The method of claim 6, wherein determining, according to the electric quantity, whether to end charging comprises:
determining to continue charging in response to the electric quantity being lower than or equal to a preset threshold electric quantity; and
determining to end charging in response to the electric quantity being higher than the preset threshold electric quantity.

8. The method of claim 1, further comprising the following before detecting the charging voltage during the FFC:
establishing a connection with a charging apparatus and enabling the FFC.

9. The method of claim 1, wherein the charging voltage is an open-circuit voltage of a battery.

10. The method of claim 1, wherein the preset threshold duration is set considering at least one of: a float voltage of a battery, internal resistance parameters of the battery, and user settings.

11. A terminal, comprising:
a battery;
a processor; and
a memory coupled with the processor and configured to store programs which, when executed by the processor, are operable with the processor to:
detect a charging voltage in applying flash fast charging (FFC) to the battery;
end the FFC according to the charging voltage to temporarily stop charging of the battery, and record a standing duration in which no charging voltage is applied to the terminal, wherein the standing duration is indicative of time which has elapsed after charging of the terminal is ended; and
apply a preset safe current to the battery in response to the standing duration being longer than or equal to a preset threshold duration.

12. The terminal of claim 11, wherein the memory is further configured to store programs which, when executed by the processor, are operable with the processor to perform one of the following:
determine to end the FFC in response to the charging voltage being equal to or higher than a preset threshold voltage; and
determine to continue the FFC in response to the charging voltage being lower than the preset threshold voltage.

13. The terminal of claim 11, wherein the memory is further configured to store programs which, when executed by the processor, are operable with the processor to:
detect an electric quantity of the battery in real time in response to the battery being charged according to the preset safe current; and
determine, according to the electric quantity, whether to end charging.

14. The terminal of claim 13, wherein the memory is further configured to store programs which, when executed by the processor, are operable with the processor to:
determine to continue charging in response to the electric quantity being lower than or equal to a preset threshold electric quantity; and
determine to end charging in response to the electric quantity being higher than the preset threshold electric quantity.

15. The terminal of claim 11, wherein the charging voltage is an open-circuit voltage of the battery.

16. The terminal of claim 11, wherein the preset threshold duration is set considering at least one of: a float voltage of the battery, internal resistance parameters of the battery, and user settings.

17. A non-transitory computer readable storage medium configured to store programs which, when executed with a computer, are operable with a computer to:
detect a charging voltage in response to applying flash fast charging (FFC) to a battery;
determine whether to end the FFC according to the charging voltage;
end the FFC to temporarily stop charging of the battery, and record a standing duration in which no charging voltage is applied to a terminal, wherein the standing duration is indicative of time which has elapsed after the FFC is ended; and
apply a preset safe current to the terminal in response to the standing duration being longer than or equal to a preset threshold duration.

18. The non-transitory computer readable storage medium of claim 17 being further configured to store programs which, when executed with a computer, are operable with a computer to perform one of the following:
determine to end the FFC in response to the charging voltage being equal to or higher than a preset threshold voltage; and
determine to continue the FFC in response to the charging voltage being lower than the preset threshold voltage.

19. The non-transitory computer readable storage medium of claim 17 being further configured to store programs which, when executed with a computer, are operable with a computer to:
detect an electric quantity of the battery in real time; and
determine continue charging in response to the electric quantity being lower than or equal to a preset threshold electric quantity or determine to end charging in response to the electric quantity being higher than the preset threshold electric quantity.

20. The non-transitory computer readable storage medium of claim 17, wherein the charging voltage is an open-circuit voltage of the battery.

\* \* \* \* \*